United States Patent
Hwang

(10) Patent No.: US 8,072,722 B1
(45) Date of Patent: Dec. 6, 2011

(54) ELECTROSTATIC DISCHARGE PROTECTION CIRCUIT

(75) Inventor: Justin Hwang, Mountain View, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 351 days.

(21) Appl. No.: 12/485,220

(22) Filed: Jun. 16, 2009

(51) Int. Cl.
*H02H 9/04* (2006.01)

(52) U.S. Cl. .......................................... 361/56

(58) Field of Classification Search .................. 361/56, 361/91, 119
See application file for complete search history.

(56) References Cited

U.S. PATENT DOCUMENTS

| | | | |
|---|---|---|---|
| 5,311,391 | A | 5/1994 | Dungan et al. |
| 6,597,227 | B1 | 7/2003 | Yue et al. |
| 6,661,273 | B1 | 12/2003 | Lai et al. |
| 6,963,112 | B2 | 11/2005 | Chen |
| 7,545,614 | B2 | 6/2009 | Traynor et al. |
| 7,593,204 | B1 | 9/2009 | Iversen et al. |
| 2008/0019064 | A1* | 1/2008 | Chaine et al. ............. 361/56 |
| 2011/0176245 | A1* | 7/2011 | Worley et al. ............. 361/56 |

OTHER PUBLICATIONS

U.S. Appl. No. 12/109,240.
"U.S. Appl. No. 12/109,240 Office Action", Jan. 11, 2010, 11 pages.

* cited by examiner

*Primary Examiner* — Stephen W Jackson
*Assistant Examiner* — Angela Brooks
(74) *Attorney, Agent, or Firm* — DeLizio Gilliam, PLLC

(57) ABSTRACT

Electrostatic discharge (ESD) can affect the operation of and even damage an unprotected integrated circuit. Conventional ESD protection circuits may not be able to protect the integrated circuit if the voltage at the output of the integrated circuit swings with large amplitude. In some embodiments, an ESD protection circuit comprising switching circuitry that provides a low AC impedance path to ground can prevent improper triggering of the ESD protection circuit during normal operation of the integrated circuit, while ensuring that the ESD protection circuit device reliability is not compromised.

20 Claims, 3 Drawing Sheets

| MODE OF OPERATION | COMPONENT STATES | | |
|---|---|---|---|
| | SNAPBACK SWITCH DEVICE 130 | CASCODE SWITCH DEVICE 128 | SNAPBACK DEVICE 132 |
| NORMAL MODE | ON | ON | OFF |
| DURING ESD EVENT | OFF | OFF | ON |

ELECTROSTATIC DISCHARGE PROTECTION CIRCUIT

BACKGROUND

Embodiments of the inventive subject matter generally relate to the field of integrated circuits, and more particularly, to techniques for electrostatic discharge protection for integrated circuits.

Electrostatic discharge (ESD) occurs due to transfer of static charge from an object (e.g., a human body) to an integrated circuit. The electrostatic discharge can affect the operation of the integrated circuit and even damage the integrated circuit if the integrated circuit is not adequately protected.

SUMMARY

Various embodiments are disclosed for protecting an integrated circuit from electrostatic discharge. In one embodiment, the integrated circuit comprises a transmit circuit comprising an RF circuit for processing an RF signal and a transmitter unit for transmitting the RF signal. The integrated circuit also comprises an electrostatic discharge protection circuit coupled to an output terminal of the RF circuit. The electrostatic discharge protection circuit comprises a cascode transistor, a snapback transistor, a cascode switch circuit, and a snapback switch circuit. A drain terminal of the cascode transistor is coupled to the output terminal of the RF circuit. A source terminal of the cascode transistor is coupled to a drain terminal of the snapback transistor and a source terminal of the snapback transistor is coupled to ground. A gate terminal of the cascode transistor is coupled to the cascode switch circuit and a gate terminal of the snapback transistor is coupled to the snapback switch circuit. The cascode switch circuit and the snapback switch circuit are operable to provide a low impedance path to ground to the gate terminals of the cascode transistor and snapback transistor, respectively, to disable the electrostatic discharge protection circuit during a normal operational mode of the integrated circuit. The cascode switch circuit and the snapback switch circuit are operable to provide a high impedance path to ground to the gate terminals of the cascode transistor and snapback transistor, respectively, to enable the electrostatic discharge protection circuit to ground electrostatic discharge pulses during an electrostatic discharge event.

BRIEF DESCRIPTION OF THE DRAWINGS

The present embodiments may be better understood, and numerous objects, features, and advantages made apparent to those skilled in the art by referencing the accompanying drawings.

FIG. 1A is an example block diagram of an ESD protected integrated circuit;

DESCRIPTION OF THE EMBODIMENT(S)

Figure 1B:
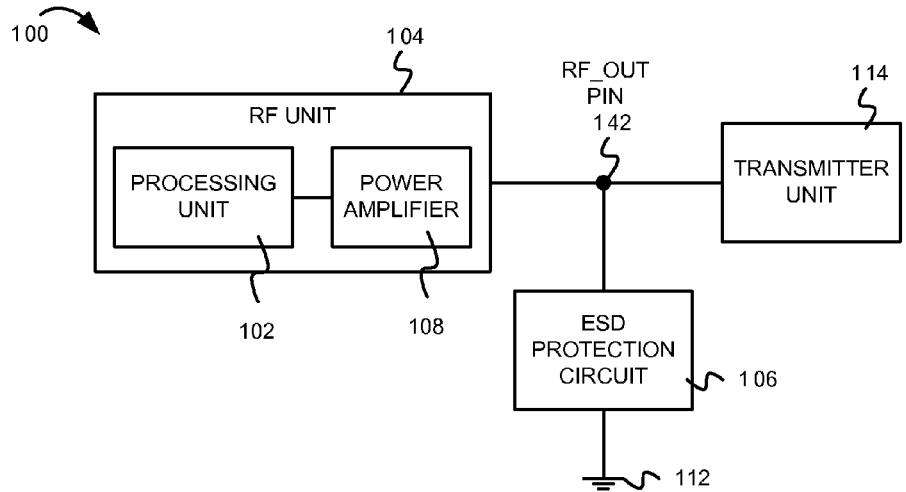
FIG. 1B is an circuit diagram illustrating one embodiment of an ESD protection circuit.

The description that follows includes exemplary circuits, systems, and methods that embody techniques of the present inventive subject matter. However, it is understood that the described embodiments may be practiced without these specific details. For instance, although examples refer to an ESD protection circuit for a transmit chain in a transceiver, embodiments can also refer to the ESD protection circuit protecting a receive chain in a transceiver from an ESD event. For instance, well-known instruction instances, protocols, structures, and techniques have not been shown in detail in order not to obfuscate the description.

ESD protection circuits operate by detecting and diverting a high voltage, high current ESD pulse. Typically, a conventional ESD protection circuit comprises a grounded-gate N-type Metal Oxide Semiconductor (GGNMOS) with the gate of the NMOS grounded via either a large resistor or a hard short. However, such an ESD protection circuit may not be able to protect RF circuitry (or other device under protection) if the voltage at the RF circuitry swings with a large amplitude. In some embodiments, an ESD protection circuit designed to handle the large voltage swings typically encountered at the output of a power amplifier in the RF circuitry can ensure that the ESD protection circuit is not activated by the large amplitude and frequency swings in the RF signal. Additionally, an ESD protection circuit designed to operate reliably in the presence of RF signal with large swings can prevent degradation of ESD protection circuit performance.

FIG. 1A is an example block diagram of an ESD protected integrated circuit 100. FIG. 1A depicts an RF unit 104 connected to a transmitter unit 114. Node 142 (RF_OUT pin) depicts a connection point between the RF unit 104 and the transmitter unit 114. The node 142 can be a pin (e.g., in the integrated circuit) at which the output of the RF unit 104 is tapped. An ESD protection circuit 106 is connected between the RF_OUT pin 142 and a ground terminal 112. The RF unit 104 also comprises a processing unit 102 coupled with a power amplifier 108.

The processing unit 102 can comprise one or more interconnected components (e.g., passive components, active components, integrated circuits, etc.) for processing an input signal. For example, the processing unit 102 can comprise a filter section (not shown) to filter out one or more frequency bands in an input signal. The RF unit 104 and/or the processing unit 102 can also comprise one or more amplifier stages for amplifying an RF signal to be transmitted. The last stage in the RF unit 104 is typically the power amplifier 108. After the power amplifier 108 amplifies the RF signal to be transmitted, the amplified RF signal is transmitted to the transmitter unit 114. The transmitter unit 114 comprises an antenna (not shown) which is used to transmit the RF signal. In some implementations, the transmitter unit 114 can also comprise one or more additional amplifier units. The ESD protection circuit 106 protects the power amplifier 108 in the RF unit 104 from high-voltage, high-current surges generated by an ESD event. The ESD protection circuit 106 may behave like an open circuit (or provide a high impedance path to ground 112) during normal operation (i.e., at RF frequencies when there is no ESD pulse). Thus, the RF signal passes directly from the RF unit 104 to the transmitter unit 114. During the ESD event, the ESD protection circuit 106 switches on and provides the ESD pulse with a low impedance path to ground 112. The ESD pulse follows a path of least resistance and is diverted through the ESD protection circuit 106, thus protecting the RF unit 104 from the effects of the high-voltage, high-current ESD pulse.

Although FIG. 1A depicts the ESD protection circuit 106 as part of the transmit circuit of a transceiver, the ESD protection circuit 106 can also be used to protect individual components, devices, and/or integrated circuits from high-voltage, high-current ESD signals. For example, the ESD protection circuit 106 can be used as part of a receive chain in the transceiver circuit. FIG. 1B further depicts implementation details of the ESD protection circuit 106.

FIG. 1B is a circuit diagram illustrating one embodiment of the ESD protection circuit 106. FIG. 1B depicts an RC circuit 150 connected to a power supply (VDD) 140 and connected to a cascode device 134. The cascode device 134 is also connected to a snapback device 132. In one embodiment, the cascode device 134 and the snapback device 132 are NMOS field-effect transistors (FETs). The cascode device 134 is connected to a ground terminal 160 via a cascode switch circuit 152. The snapback device 132 is connected to the ground terminal 160 via a snapback switch device 130.

Figure 1B:
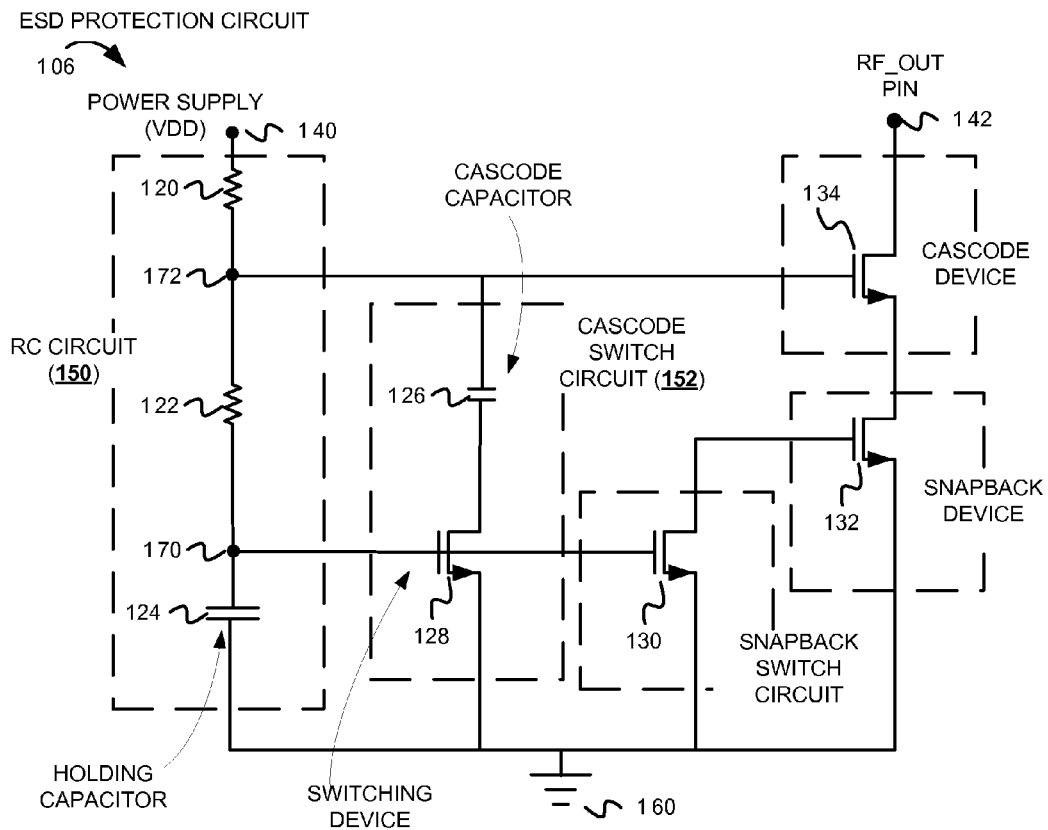

As illustrated, the drain terminal of the cascode device 134 is connected to the RF_OUT pin 142. The RF_OUT pin 142 may be a chip pad connecting the ESD protection circuit 106 to an RF unit (e.g., the RF unit 104 of FIG. 1). The source terminal of the cascode device 134 is connected in series with the drain terminal of the snapback device 132. The source terminal of the snapback device 132 is connected to the ground terminal 160.

The gate of the snapback device 132 is grounded (i.e., connected to the ground terminal 160) through an active resistor device, namely the snapback switch device 130. In one embodiment, the snapback switch device 130 is an NMOSFET. The gate terminal of the snapback device 132 is connected to the drain terminal of the snapback switch device 130. The source terminal of the snapback switch device 130 is connected to the ground terminal 160. The gate terminal of the snapback switch device 130 is connected to the RC circuit 150.

The gate terminal of the cascode device 134 is connected to the cascode switch circuit 152. In one implementation, the cascode switch circuit 152 comprises a cascode capacitor 126 and a switching device 128. In one implementation, the switching device 128 is an NMOSFET. A first terminal of the cascode capacitor 126 is connected in series with the drain terminal of a switching device 128. The source terminal of the switching device 128 is connected to the ground terminal 160. A second terminal of the cascode capacitor 126 is connected to the gate terminal of the cascode device 134. The gate terminal of the switching device 128 is connected to the RC circuit 150. The cascode capacitor 126 can form a capacitive voltage divider with the gate-drain capacitance of the cascode device 134, thus reducing the amount of RF signal that can couple to the gate of the cascode device 134. In various implementations, the cascode capacitor 126 should be large enough to have low impedance at RF frequencies.

In one implementation, the RC circuit 150 comprises a resistor 120, a resistor 122, and a holding capacitor 124. A first terminal of the resistor 120 is connected in series with a first terminal of the resistor 122 at node 172. A second terminal of the resistor 122 is connected in series with a first terminal of the holding capacitor 124 at node 170. A second terminal of the holding capacitor 124 is connected to the ground terminal 160, while a second terminal of the resistor 120 is connected to the power supply 140. The gate terminals of the snapback switch device 130 and the switching device 128 are connected to the node 170 of the RC circuit 150. The gate terminal of the cascode device 134 is connected to the node 172 of the RC circuit 150. The resistor 120 provides filtering and isolates the ESD protection circuit 106 from the supply voltage 140. In various implementations, the values of resistors 120 and 122 and the holding capacitor 124 should be selected so that the RC time constant of the RC circuit 150 is such that the snapback device 132 does not turn on during a power on event (i.e., when the power supply 140 voltage ramps up). The values of the resistors 120 and 122 and the capacitor 124 may be selected such that the RC time constant is fast enough to track the power supply ramp (e.g., during a power on event), which keeps the ESD circuit disabled under normal operation, but slow enough to keep the ESD protection circuit 106 active during a faster ESD event.

An RF signal at the output of a power amplifier (e.g., the power amplifier 108 of the RF unit 104) can swing as much as twice the peak supply voltage 140 (2*VDD) at RF frequencies. Under normal operation conditions (e.g., at the RF frequencies), if the gate of the cascode device 134 is not a low AC impedance point, the high voltage peaks of a power amplifier (e.g., the power amplifier 108 of the RF unit 104) swing can couple to the gate of the cascode device 134 and can get rectified at the source of the cascode device 134. This voltage appears at the drain of the snapback device 132 and is a rectified version of the 2*VDD RF signal peaks minus some coupling loss and the threshold voltage of the cascode device 134. The amplitude of the rectified signal may not be large enough to trigger snapback action, but may be large enough to degrade long-term reliability of the snapback device 132. By providing a good AC ground to the gate terminal of the cascode device 134, the cascode switch circuit 152 can address the reliability issues and prevent improper triggering of the ESD protection circuit 106 due to variations in RF signal amplitude Under normal operating conditions, since the supply voltage 140 is present, the RC circuit 150 drives the gate terminal of the snapback switch device 130 and switches on the snapback switch device 130. The snapback switch device 130 grounds the gate of the snapback device 132 with low impedance. Thus, the gate of the snapback device 132 is a low impedance point ensuring that the snapback device 132 and the ESD protection circuit 106 are isolated from the RF unit 104. The RC circuit 150 also drives the gate terminal of the switching device 128 in the cascode switch circuit 152, which switches on the switching device 128. The switching device 128 connects the cascode capacitor 126 to the gate terminal of the cascode device 134, and creates a low impedance AC ground. In other words, the gate of the cascode device 134 is a low impedance point at RF frequencies, ensuring that the cascode device 134 is off and the ESD protection circuit 106 is not connected to the RF unit 104. Isolating the ESD protection circuit 106 from the RF unit 104 ensures that RF signals do not pass through the ESD protection circuit 106 and that the ESD protection circuit 106 does not load the RF circuit 104, the power amplifier 108 in the RF circuit, or other components in the integrated circuit.

During an ESD event, the power supply 140 may not be present. The RC circuit 150 does not drive the gate of the snapback switch device 130 and, therefore, the snapback switch device 130 is off. Since the snapback switch device 130 is off, the gate of the snapback device 132 is a high impedance point.

Also, during the ESD event, the gate of the cascode device 134 should be a high impedance point, allowing the high voltage from the ESD event to couple to and switch on the cascode device 134 and the snapback device 132. Because the supply voltage 140 may be absent during an ESD event, the RC circuit 150 does not drive the gate of the switching device and, therefore, the switching device 128 is also off. In various implementations, the impedance at the gate terminal of the cascode device 134 will be large and, therefore, will not degrade the performance of the ESD protection circuit 106.

A high current, high-voltage ESD signal at the drain terminal of the cascode device 134 (i.e., the RF_OUT pin 142)

couples to the gate terminal of the cascode device 134, switching on the cascode device 134. The cascode device 134 drives and switches on the snapback device 132. The switching device 128 and the snapback switch device 130 actively control the cascode device 134 and the snapback device 132. Additionally, the holding capacitor 124 in the RC circuit 150 can ensure that the gate of the switching device 128 and the gate of the snapback switch device 130 are tied to ground (i.e., at zero potential). This may ensure that the switching device 128 and the snapback switch device 130 are off. Thus, the gates of the cascode device 134 and the snapback device 132 are high impedance points allowing for protection against ESD events.

Figures 2, 3:
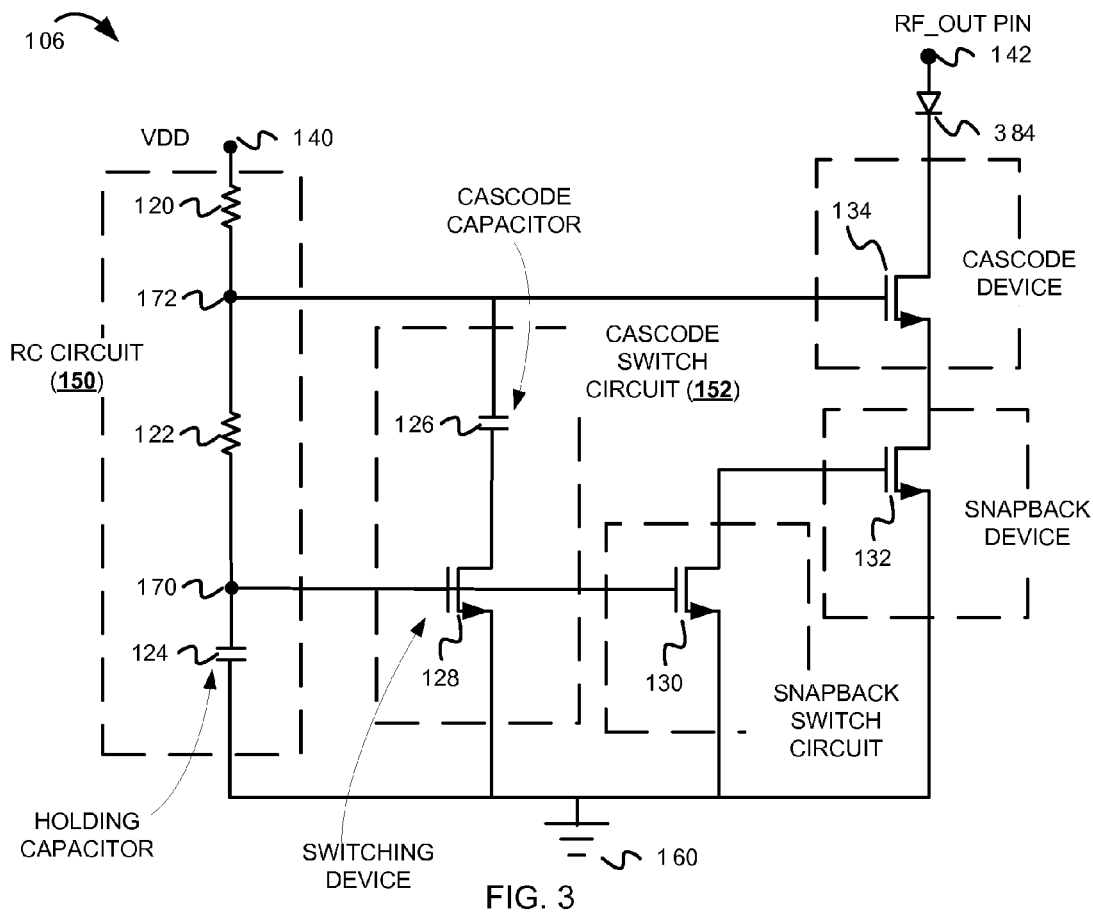
FIG. 2 is a table illustrating state of some components in the ESD protection circuit at different instances in time.
FIG. 3 is an example circuit diagram illustrating a second embodiment of the ESD protection circuit.

The state of some components of the ESD protection circuit 106 at different instances in time under normal operating conditions and during an ESD event is summarized in FIG. 2.

In some embodiments, in the RC circuit 150, the resistor 120 and the resistor 122 may have a value of 300 kΩ while the holding capacitor 124 can have a value of 1.2 pF. In some embodiments, in the cascode switch circuit 152, the cascode capacitor 126 may have a value of 2.3 pF, and the switching device 128 may have device parameters of 24 microns/0.5 microns. Likewise, in some embodiments, the snapback switch device 130 has device parameters of 12 microns/0.5 microns, the cascode device 132 has device parameters of 12*30 microns/0.5 microns, and the snapback device 132 has device parameters of 12*30 microns/0.28 microns.

It should also be noted that the component values listed in the above paragraph are examples, and in other implementations, the components of the ESD protection circuit 106 may have other values. In one implementation, the component values may be determined based on ESD models (e.g., a human body machine (HBM) ESD model, etc). In some implementations, the switching device 128 and the snapback switch device 130 are selected such that the gate of the switching device 128 and the gate of the snapback switch device 130 are fast enough to track supply voltage ramp up but slow enough to remain at zero potential during ESD events. In some implementations, the switching device 128 and the snapback switch device 130 are selected such that the time constant (approximately equal to ((Resistor 120+Resistor 122)*Capacitor 124)) at the gates of the switching device 128 and the snapback switch device 130 is of the order of a few hundreds of nanoseconds. In some implementations, one or more of the snapback device 132, the cascode device 134, the cascode switch circuit 152, and the snapback switch device 130 maybe designed based on an estimated voltage of the ESD event. In one implementation, the ESD event may be assumed to be a 2 KV voltage surge. The ESD event may be modeled based on one or more ESD models, simulations, prior ESD events, etc. The components may also be designed and/or selected based on the integrated circuit design technology (e.g., CMOS technology) in use.

FIG. 3 is an example circuit diagram illustrating a second embodiment of the ESD protection circuit 106. FIG. 3 comprises a diode 384 connected in series between the cascode device 134 and the RF_OUT pin 142. A cathode of the diode 384 is connected to the drain terminal of the cascode device 134. An anode of the diode 384 is connected to the RF_OUT pin 142.

The diode 384 may help to minimize the effects of the lossy diffusion capacitance of the cascode device 134. In some implementations, the capacitance of the diode 384 is much smaller (e.g., of the order of a hundred femto Farads) as compared to the capacitance of the cascode device 134 (e.g., a few pico Farads). The smaller capacitance of the diode 384 dominates the larger capacitance of the cascode device 134, because the diode capacitance and the cascode capacitance are connected in series, isolating RF circuitry (e.g., the RF unit 104 of FIG. 1A) from the lossy diffusion capacitance of the cascode device 134. This minimizes loading effects of the ESD protection circuit 106 in the RF circuitry (e.g., the power amplifier 108). The diode 384 also serves to reduce the peak voltage that the ESD protection circuit 106 sees under normal operating condition (e.g., large RF signal swings at the power amplifier output), for better device reliability. Additionally, during ESD events, some of the ESD voltage is also dropped across the diode 384 (typically 0.7V when the diode is on) reducing the input ESD voltage across the ESD protection circuit 106.

It is noted that in various embodiments one or more of the components of the ESD protection circuit described may be omitted, combined, modified, or additional components included. For example, in one implementation, the ESD protection circuit 106 may include additional resistors, capacitors, and/or diodes.

Figure 4:
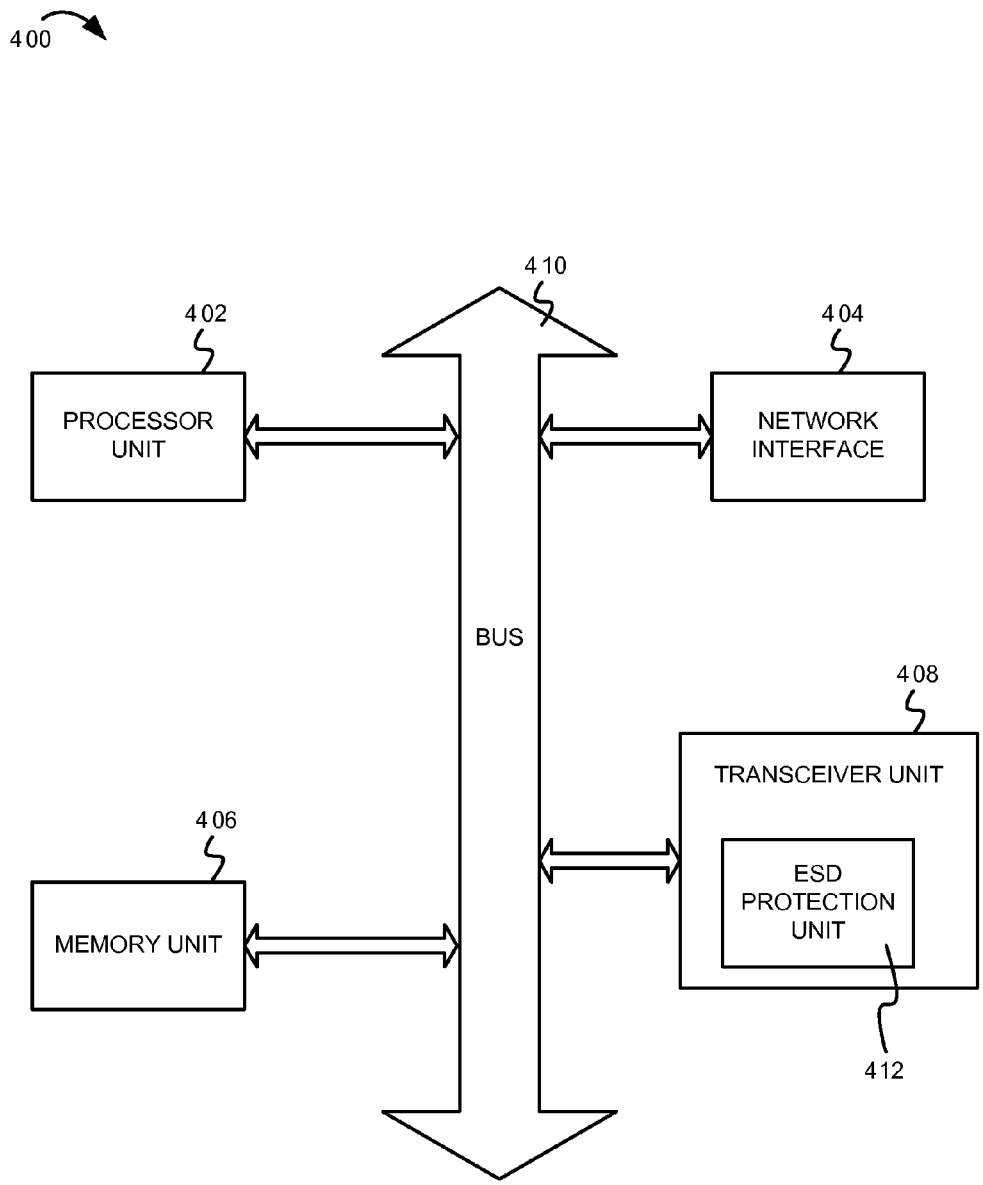
FIG. 4 depicts an example wireless device including a mechanism for ESD protection.

FIG. 4 depicts an example wireless device including a mechanism for ESD protection. In one implementation, the wireless device may be a WLAN device 400. The WLAN device may be embodied as part of an integrated circuit. The WLAN device 400 includes a processor unit 402 (possibly including multiple processors, multiple cores, multiple nodes, and/or implementing multi-threading, etc.). The WLAN device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device 400 also includes a bus 410 (e.g., PCI, ISA, PCI-Express, HyperTransport®, InfiniBand®, NuBus, etc.), and network interfaces 404 that include at least one wireless network interface (e.g., a WLAN interface, a Bluetooth® interface, a WiMAX interface, a ZigBee® interface, a Wireless USB interface, etc.). The WLAN device 400 also includes a transceiver unit 408. The transceiver unit 408 comprises an ESD protection unit 412. The ESD protection unit 412 implements functionality for protecting a transmit chain in the transceiver unit 408 from high voltage high current signals resulting from electrostatic discharge. The ESD protection unit 412 implements functionality as described in accordance with FIGS. 1A-3.

It is noted that in some embodiments the WLAN device 400 may include fewer or additional components not illustrated in FIG. 4 (e.g., additional network interfaces, peripheral devices, etc.). The processor unit 402 and the network interfaces 404 are coupled to the bus 410. Although illustrated as being coupled to the bus 410, the memory 406 may be coupled to the processor unit 402.

While the embodiments are described with reference to various implementations and exploitations, it will be understood that these embodiments are illustrative and that the scope of the inventive subject matter is not limited to them. In general, the electrostatic discharge protection circuit as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An integrated circuit comprising:
   a transmit circuit comprising an RF circuit for processing an RF signal and a transmitter unit for transmitting the RF signal; and
   an electrostatic discharge protection circuit coupled to an output terminal of the RF circuit, wherein the electrostatic discharge protection circuit comprises a cascode transistor, a snapback transistor, a cascode switch circuit, and a snapback switch circuit, wherein a drain terminal of the cascode transistor is coupled to the output terminal of the RF circuit, wherein a source terminal of the cascode transistor is coupled to a drain terminal of the snapback transistor, and a source terminal of the snapback transistor is coupled to ground, wherein a gate terminal of the cascode transistor is coupled to the cascode switch circuit and a gate terminal of the snapback transistor is coupled to the snapback switch circuit;
   wherein the cascode switch circuit and the snapback switch circuit are operable to provide a low impedance path to ground to the gate terminals of the cascode transistor and snapback transistor, respectively, to disable the electrostatic discharge protection circuit during a normal operational mode of the integrated circuit, and are operable to provide a high impedance path to ground to the gate terminals of the cascode transistor and snapback transistor, respectively, to enable the electrostatic discharge protection circuit to ground electrostatic discharge pulses during an electrostatic discharge event.

2. The integrated circuit of claim 1, wherein, during the normal operational mode, the cascode switch circuit and the snapback switch circuit are operable to provide a low impedance path to ground to the gate terminals of the cascode transistor and snapback transistor, respectively, to disable the cascode transistor and the snapback transistor, and isolate the electrostatic discharge protection circuit from the RF circuit.

3. The integrated circuit of claim 1, wherein, during an electrostatic discharge event, the cascode transistor and snapback transistor are enabled to ground electrostatic discharge pulses.

4. The integrated circuit of claim 1, wherein the RF circuit comprises a power amplifier, and wherein the electrostatic discharge protection circuit is coupled to an output terminal of the power amplifier.

5. The integrated circuit of claim 1, wherein the cascode switch circuit comprises a first transistor and a cascode capacitor, wherein a first terminal of the cascode capacitor is coupled to the gate terminal of the cascode transistor, a second terminal of the cascode capacitor is coupled to a drain terminal of the first transistor, a source terminal of the first transistor is coupled to ground, and a gate terminal of the first transistor is coupled to an RC circuit.

6. The integrated circuit of claim 5, wherein the snapback switch circuit comprises a second transistor, wherein a drain terminal of the second transistor is coupled to the gate terminal of the snapback transistor, a gate terminal of the second transistor is coupled to the RC circuit, and a source terminal of the second transistor is coupled to ground.

7. The integrated circuit of claim 6, wherein one or more of the cascode transistor, the snapback transistor, the first transistor of the cascode switch circuit, and the second transistor of the snapback switch circuit is an N-type metal oxide semiconductor field effect transistor.

8. The integrated circuit of claim 6, wherein the RC circuit comprises a first resistor, a second resistor, and a holding capacitor connected in series, wherein a first terminal of the first resistor is coupled to a power supply, a second terminal of the first resistor is coupled to a first terminal of the second resistor, second terminal of the second resistor is coupled to a first terminal of the holding capacitor, and a second terminal of the holding capacitor is coupled to ground.

9. The integrated circuit of claim 8, wherein the second terminal of the first resistor is coupled to the gate terminal of the cascode transistor and the second terminal of the second resistor is coupled to the gate terminals of the first and second transistors.

10. The integrated circuit of claim 1, further comprising a diode coupled between the output terminal of the RF circuit and the electrostatic discharge protection circuit, wherein an anode of the diode is coupled to the output terminal of the RF circuit and a cathode of the diode is coupled to the drain terminal of the cascode transistor.

11. An integrated circuit comprising:
    a transmit circuit comprising an RF circuit for processing an RF signal and a transmitter unit for transmitting the RF signal; and
    an electrostatic discharge protection circuit coupled to an output terminal of the RF circuit, the electrostatic discharge protection circuit comprising:
       a cascode transistor and a snapback transistor, wherein a drain terminal of the cascode transistor is coupled to the output terminal of the RF circuit, wherein a source terminal of the cascode transistor is coupled to a drain terminal of the snapback transistor, and a source terminal of the snapback transistor is coupled to ground;
       a cascode switch circuit and a snapback switch circuit, wherein the cascode switch circuit comprises a first capacitor and a first transistor, wherein the snapback switch circuit comprises a second transistor, wherein a gate terminal of the cascode transistor is coupled to a first terminal of the first capacitor, a second terminal of the first capacitor is coupled to a drain terminal of the first transistor, and a source terminal of the first transistor is coupled to ground, wherein a gate terminal of the snapback transistor is coupled to a drain terminal of the second transistor and a source terminal of the second transistor is coupled to ground; and
       an RC circuit coupled to the gate terminal of the cascode transistor, a gate terminal of the first transistor, and a gate terminal of the second transistor.

12. The integrated circuit of claim 11, wherein the RC circuit comprises a first resistor, a second resistor, and a holding capacitor, wherein a first terminal of the first resistor is coupled to a power supply, a second terminal of the first resistor is coupled to a first terminal of the second resistor, a second terminal of the second resistor is coupled to a first terminal of the holding capacitor, and a second terminal of the holding capacitor is coupled to ground.

13. The integrated circuit of claim 12, wherein the second terminal of the first resistor is coupled to the gate terminal of the cascode transistor and the second terminal of the second resistor is coupled to the gate terminal of the first and the second transistors.

14. The integrated circuit of claim 12, further comprising a diode coupled between the output terminal of the RF circuit and the electrostatic discharge protection circuit, wherein an anode of the diode is coupled to the output terminal of the RF circuit and a cathode of the diode is coupled to the drain terminal of the cascode transistor.

15. The integrated circuit of claim 12, wherein one or more of the cascode transistor, the snapback transistor, the first transistor in the cascode switch circuit, and the second transistor of the snapback circuit is an N-type metal oxide semiconductor field effect transistor.

16. A wireless device comprising:
an RF unit configured to process an RF signal, wherein the RF unit comprises a power amplifier;
a transmitter unit configured transmit the RF signal; and
an electrostatic discharge protection circuit coupled to an output terminal of the RF circuit, the electrostatic discharge protection circuit comprising:
a cascode transistor and a snapback transistor, wherein a drain terminal of the cascode transistor is coupled to the output terminal of the RF circuit, wherein a source terminal of the cascode transistor is coupled to a drain terminal of the snapback transistor, and a source terminal of the snapback transistor is coupled to ground;
a cascode switch circuit and a snapback switch circuit, wherein the cascode switch circuit comprises a first capacitor and a first transistor, wherein the snapback switch circuit comprises a second transistor, wherein a gate terminal of the cascode transistor is coupled to a first terminal of the first capacitor, a second terminal of the first capacitor is coupled to a drain terminal of the first transistor, and a source terminal of the first transistor is coupled to ground, wherein a gate terminal of the snapback transistor is coupled to a drain terminal of the second transistor and a source terminal of the second transistor is coupled to ground; and
an RC circuit comprising a first resistor, a second resistor, and a holding capacitor, wherein a first terminal of the first resistor is coupled to a power supply, a second terminal of the first resistor is coupled to a first terminal of the second resistor, a second terminal of the second resistor is coupled to a first terminal of the holding capacitor, and a second terminal of the holding capacitor is coupled to ground.

17. The wireless device of claim 16, wherein the second terminal of the first resistor is coupled to the gate terminal of the cascode transistor and the first terminal of the first capacitor, and the second terminal of the second resistor is coupled to the gate terminals of the first and the second transistors.

18. The wireless device of claim 16, further comprising a diode coupled between the output terminal of the RF circuit and the electrostatic discharge protection circuit, wherein an anode of the diode is coupled to the output terminal of the RF circuit and a cathode of the diode is coupled to the drain terminal of the cascode transistor.

19. The wireless device of claim 16, wherein, during a normal operational mode in the absence of an electrostatic discharge event, the cascode switch circuit and the snapback switch circuit are operable to provide a low impedance path to ground to the gate terminals of the cascode transistor and snapback transistor, respectively, to disable the cascode transistor and the snapback transistor, and isolate the electrostatic discharge protection circuit from the RF circuit.

20. The wireless device of claim 16, wherein, during an electrostatic discharge event, the cascode switch circuit and the snapback switch circuit are operable to provide a high impedance path to ground to the gate terminals of the cascode transistor and snapback transistor, respectively, to enable the electrostatic discharge protection circuit to ground electrostatic discharge pulses.

\* \* \* \* \*